(12) United States Patent
Cardarelli (10) Patent No.: US 7,472,596 B1
(45) Date of Patent: Jan. 6, 2009

(54) GRA MEMS ACCELEROMETER

(76) Inventor: Donato Cardarelli, 16 Ledgetree Rd., Medfield, MA (US) 02052

( * ) Notice: Subject to any disclaimer, the term of this patent is extended or adjusted under 35 U.S.C. 154(b) by 0 days.

(21) Appl. No.: 11/460,115

(22) Filed: Jul. 26, 2006

Related U.S. Application Data

(60) Provisional application No. 60/702,422, filed on Jul. 26, 2005.

(51) Int. Cl.
*G01P 15/14* (2006.01)
(52) U.S. Cl. ................................. 73/514.15
(58) Field of Classification Search .............. 73/514.01, 73/514.15, 514.18, 514.38, 504.12
See application file for complete search history.

(56) References Cited

U.S. PATENT DOCUMENTS

| 5,457,993 | A | 10/1995 | Sapuppo |
| 5,691,470 | A | 11/1997 | Sapuppo et al. |
| 5,712,426 | A | 1/1998 | Sapuppo et al. |
| 6,392,220 | B1 * | 5/2002 | Slater et al. ............ 73/514.38 |
| 6,546,799 | B1 * | 4/2003 | Vigna et al. ............ 73/514.01 |
| 6,845,669 | B2 * | 1/2005 | Acar et al. ............. 73/504.12 |

* cited by examiner

*Primary Examiner*—John E Chapman
(74) *Attorney, Agent, or Firm*—Brian M. Dingman; Mirick, O'Connell, Demalllie & Lougee (57) ABSTRACT

An accelerometer that lies generally in a plane, for detecting acceleration along an input axis. There is a substrate, a generally planar Servo Member (SM) flexibly coupled to the substrate such that it is capable of oscillatory motion about a servo axis that lies in the plane, a generally planar Torque Summing Member (TSM) coplanar with and flexibly coupled to the SM such that the TSM is capable of rotary motion relative to the SM about an output axis that is in the plane and orthogonal to the servo axis, wherein the TSM is mass-imbalanced relative to the output axis, and a generally planar rotor coplanar with and flexibly coupled to the TSM such that it is capable of rotary oscillatory motion relative to the TSM about a rotor axis that is orthogonal to the plane of the members. There are drives for oscillating the rotor about the rotor axis and for oscillating the SM about the servo axis. Output sensors detect oscillation of the rotor about the rotor axis and of the SM about the servo axis. Output sensors detect rotation of the TSM about the output axis.

38 Claims, 10 Drawing Sheets

GRA MEMS ACCELEROMETER

CROSS REFERENCE TO RELATED APPLICATION

This application claims priority of provisional application Ser. No. 60/702,422 filed on Jul. 26, 2005, the disclosure of which is incorporated herein by reference.

STATEMENT REGARDING FEDERALLY SPONSORED RESEARCH

This invention was made with government support under contract number HQ0006-05-C-2718 issued by the MDA. The government has certain rights in this invention.

FIELD OF THE INVENTION

This invention relates to accelerometer designs.

BACKGROUND OF THE INVENTION

Closed loop MEMS pendulous accelerometers typically use torque rebalance with a voltage-controlled capacitive actuator to hold the pendulum at null. Assuming the actuator is stable, the voltage applied is proportional to acceleration. The accelerometers are calibrated to obtain the scale factor (acceleration to voltage proportionality). In this implementation, the torque applied is not measured directly. The accuracy and stability will be dependent on the accuracy and stability of the applied voltage and the actuator functionality, thereby limiting scale factor accuracy if only the voltage is measured. To increase performance of MEMS accelerometers, the stability in the components becomes more critical.

In the Pendulous Integrating Gyro Accelerometer (PIGA), a single degree-of-freedom (SDF) gyro is mounted onto a rotating platform that allows the gyro to be rotated about its Input Axis. The gyro contains a wheel that spins about the SRA (Spin Reference Axis). The wheel is mounted to a gimbal that can rotate about the Output Axis (OA). The gimbal is mounted within a case that is in turn attached to the rotating platform via a post. The SRA and OA are orthogonal. During operation, in response to a rotation of the case about the gyro Input Axis, the gyro gimbal responds with a rotation about the Output Axis. By rotating the platform, the same gimbal rotation will result.

To make a PIGA, the gyro is made purposely unbalanced by the addition of a mass along the SRA axis, to convert the gimbal into a pendulum. Under acceleration, the unbalanced mass generates a torque that tends to rotate the gimbal about the OA. By rotation of the platform (servo member) in the appropriate direction, the gimbal can be returned to its null position. Note that the pendulous torque and the gyro torque act on a common member, the gimbal. For this reason the gimbal is referred to as a Torque Summing Member (TSM).

The PIGA equation of motion for the gimbal rotation angle $\alpha$ is given by $$I\ddot{\theta}+D\dot{\theta}+K\theta=H_{spin}\dot{\phi}-Pa$$

where $H_{spin}\dot{\phi}$ is the gyro torque; Pa is the pendulous torque; $H_{spin}=I_{wheel}\alpha_{spin}$ is the wheel angular momentum; $I_{wheel}$ is the wheel moment of inertia about the spin axis; $\dot{\phi}$ is the rotation rate of the platform; $\alpha_{spin}$ is the spin rate of the wheel; P is the pendulosity; and a is the input acceleration. In closed loop operation, the gyro torque is equal to the pendulous torque, $H_{spin}\dot{\phi}=Pa$. The acceleration is then given by $$a = \frac{H_{spin}}{P}\dot{\phi} \qquad (2)$$

where $$\frac{H_{spin}}{P}$$

is the Scale Factor.

One unique attribute of the PIGA is that when both sides of equation 2 are integrated, the following expression is obtained.

$$v = \frac{H_{spin}}{P}\phi \qquad (3)$$

This expression represents the mechanical integration of acceleration, and the velocity is given directly by the Servo Member angle. The significance of this is that numerical integration is not required and a source of random walk in velocity is eliminated.

A second PIGA attribute is that the accuracy of the measurement only depends on the measurement of the platform angle for the velocity read-out or the rate of the platform rotation for the acceleration read-out, since the wheel speed is maintained constant by a synchronous drive motor whose speed is determined by the drive frequency only, and not on the magnitude of the voltages/currents applied to spin the wheel and rotate the platform. This attribute is possible because a very stable gyroscope is used to provide a very accurate rebalance torque.

The Gyro-Rebalanced Accelerometer (GRA) is intended to overcome the instability of torque rebalance components by applying a gyroscopic torque that can be measured directly. The principle has been shown in U.S. Pat. Nos. 5,457,993, 5,691,470 and 5,712,426, the disclosures of which are incorporated herein by reference. The significance of this approach is that the acceleration-produced torque is balanced by a gyroscopic torque; both are inertial torques.

SUMMARY OF THE INVENTION

This invention relates to designs and implementations of a Gyro Rebalanced Accelerometer (GRA).

This invention further relates to planar GRA designs capable of being fabricated with MEMS processing technologies.

This invention further relates to the components of the design and how they provide the functionality of the GRA.

This invention also relates to open-loop operation of the GRA.

This invention also relates to GRA designs optimized for MEMS fabrication processes.

This invention also relates to offset operation of the GRA as defined by the frequency difference between the Rotor and Servo Member natural frequencies. The preferred offset is zero. Non-zero offset requires that the frequency difference is small to minimize the drive power.

This invention also relates to monolithic constructions of the GRA to minimize structural instability. Because of this, the structure is electrically connected to ground.

This invention features an accelerometer that lies generally in a plane, for detecting acceleration along an input axis, comprising a substrate, a generally planar Servo Member (SM) flexibly coupled to the substrate such that it is capable of oscillatory motion about a servo axis that lies in the plane, a generally planar Torque Summing Member (TSM) coplanar with and flexibly coupled to the SM such that the TSM is capable of rotary motion relative to the SM about an output axis that is in the plane and orthogonal to the servo axis, wherein the TSM is mass-imbalanced relative to the output axis, and a generally planar rotor coplanar with and flexibly coupled to the TSM such that it is capable of rotary oscillatory motion relative to the TSM about a rotor axis that is orthogonal to the plane. There are one or more rotor drives for oscillating the rotor about the rotor axis, and one or more SM drives for oscillating the SM about the servo axis. There are also one or more rotor output sensors that detect oscillation of the rotor about the rotor axis, one or more SM output sensors that detect oscillation of the SM about the servo axis, and one or more TSM output sensors that detect rotation of the TSM about the output axis.

The rotor and SM drives preferably comprise capacitive drives. The SM drive may comprise plates. There may be at least one SM drive on each side of the servo axis.

The rotor output sensors may comprise capacitive sensors, which may be comb sensors. The comb sensors may comprise sectors that are radially arranged around the output axis. There may be two pairs of adjacent comb sectors, one pair for sensing and one pair for driving. The TSM output sensors may comprise capacitive plate sensors.

The accelerometer may further comprise a controller, responsive to the rotor output sensors, for maintaining the amplitude and phase of the rotor constant. The rotor may oscillate at essentially the same frequency as the SM oscillation frequency. The rotor may be flexibly coupled to the TSM by a plurality of rotor flexures. The rotor may be circular, in which case the rotor flexures may be spaced evenly about its periphery. The rotor flexures may each comprise two bending "U" flexures, and may further comprise stress relief features comprising a bend in the flexure. The SM may be flexibly coupled to the substrate by a pair of SM linear flexures.

The rotor may be located within the TSM, and the TSM may be located within the SM. The rotor may be coupled to the TSM by flexures that are radial relative to the rotor axis. The rotor may oscillate at resonance.

The accelerometer may further comprise a controller, responsive to the SM output sensors, for maintaining the amplitude and phase of the SM constant. The accelerometer may further comprise a controller, responsive to the TSM output sensors, for causing the rotor drive to vary the phase of the rotor oscillation. The accelerometer may further comprise a controller, responsive to the TSM output sensors, for causing the SM drive to vary the phase of the SM oscillation. The accelerometer may further comprise at least one phase-lock loop control that locks onto the resonance of at least one of the rotor and SM. The accelerometer may comprise two controllers for each of the rotor and SM, one a phase-lock loop and the second an amplitude control loop.

BRIEF DESCRIPTION OF THE DRAWINGS

Other objects, features and advantages will occur to those skilled in the art from the following description of the preferred embodiments, and the accompanying drawings, in which.

PREFERRED EMBODIMENTS OF THE INVENTION

The GRA is similar in operation to the PIGA. By understanding the PIGA, the description of the POGA is simplified.

Like the PIGA, the GRA is based on the use of a stable gyroscope. However, because the rotor and Servo Member in the GRA are oscillatory, the measurement and control of their amplitudes bypasses the instability in the actuators and the voltages applied. Therefore a stable and accurate scale factor will be obtained.

GRA Description/Principle of Operation

Figure 1A:
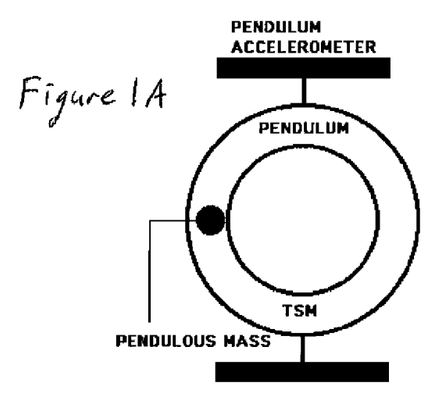
FIGS. 1A, 1B and 1C schematically depict the inventive planar GRA concept based on the oscillatory gyro and the simple pendulum accelerometer.
Figure 1B:
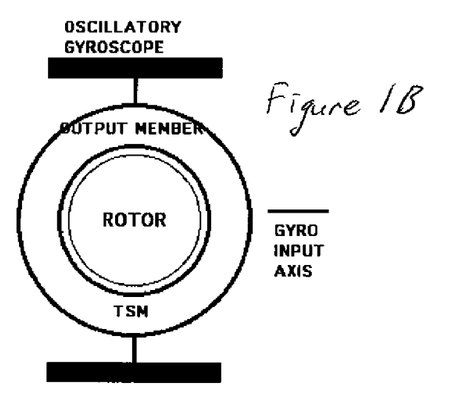
Figure 1C:
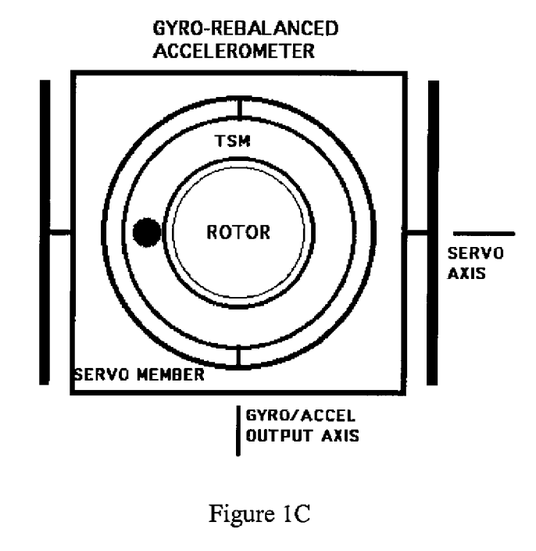

The GRA is a planar device with two oscillating members and a pendulum. FIGS. 1A-1C show how the gyroscope and pendulum are combined in one instrument. The simple pendulum accelerometer, FIG. 1A, contains an annular disk with a pendulous mass. The disk is attached to the substrate with two in-line torsional flexures. The gyroscope, FIG. 1B, contains a rotor in the center of a balanced annular disk. The disk is also attached to the substrate with two, in-line torsional flexures. The gyro is operated by oscillating the rotor about the axis normal to the plane. In response to rotation rate about the Input Axis, the annular disk (the output member) oscillates about the Output Axis, which is aligned with the torsional flexures. Radial flexures (not shown in this drawing) suspend the rotor from the inner diameter of the ring.

The GRA, FIG. 1C, is formed by functionally combining the two instruments. The annular disk (the TSM) is the common member. The pendulous mass generates rotation of the disk about the Output Axis in response to acceleration. The rotor causes oscillation of the disk when the gyro is rotated about its Input Axis. When the gyro is oscillated about its Input Axis and at the same frequency as the Rotor, the disk is rotated (not oscillated) to counter the rotation of the pendulum. To enable the oscillation of the gyro, a third member (the Servo Member or SM) is added to the outside of the Rotor and Disk. Because the gyro and pendulous mass both produce torques on the disk, the disk is called the Torque Summing Member (TSM).

The GRA equation of motion is that of the TSM (annular disk) angle of rotation subject to gyro and pendulosity torques.

$$I\ddot{\theta}+D\dot{\theta}+K\theta=H_{osc}\dot{\phi}_{osc}-Pa \qquad (4)$$

where $H_{osc}\dot{\phi}_{osc}$ is the gyro torque, Pa is the pendulous torque, $H_{osc}=I_{rotor}\alpha_{osc}$ is the rotor angular momentum, $I_{rotor}$ is the rotor moment of inertia about the oscillation axis, $\dot{\phi}_{osc}$ is the oscillation rate of the platform (TSM or disk), $\alpha_{osc}$ is the oscillation rate of the rotor, P is the pendulosity, and a is the input acceleration. In closed loop operation, the gyro torque at steady state is equal to the pendulous torque, $H_{osc}\dot{\phi}_{osc}$=Pa. The acceleration is then given by $$a = \frac{H_{osc}}{P}\dot{\phi}_{osc} \quad (5)$$

To obtain a more useful expression we substitute for $H_{osc}=I_{rotor}\alpha_{osc}$, $\alpha_{osc}=\omega\alpha_{osc}\cos\omega t$, $\dot{\phi}_{osc}=\omega\phi_{osc}\cos(\omega t-\delta)$ where $\alpha_{osc}$ is the rotor oscillation amplitude; $\phi$ is the servo oscillation amplitude; $\omega$ is the oscillation frequency and $\delta$ is the phase between the Rotor and Servo Member oscillators. The more relevant expression for acceleration becomes $$a = \frac{I_{rotor}\omega^2\tilde{\alpha}\tilde{\phi}}{2P}\cos\delta \quad (6)$$

where $$\frac{I_{rotor}\omega^2\tilde{\alpha}_{osc}\tilde{\phi}_{osc}}{2P}$$

is the Scale Factor and cos δ is the control variable for closed-loop operation. The amplitudes of oscillation are not required to be equal, but to maintain a constant scale factor, they must be held constant. To change the magnitude of the Scale Factor, the inertia, operating frequency and the oscillation amplitudes can be changed.

Figure 2:
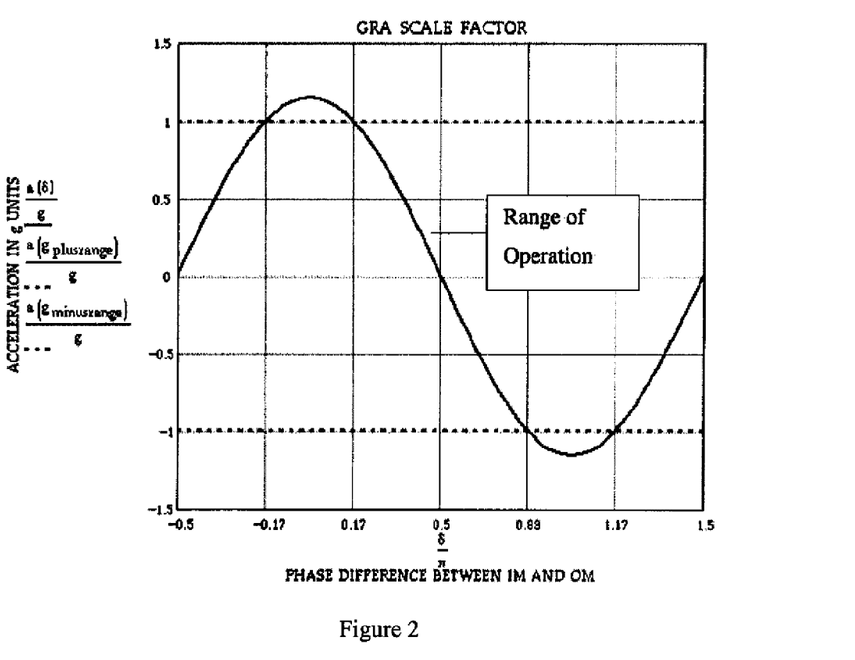
FIG. 2 is a graph of the GRA scale factor as a function of phase, $\delta$, between the Servo and Rotor Members for the invention.

FIG. 2 is a plot of the Scale Factor for a maximum acceleration of 1 g. For practical operation, the nearly linear operating range bounded by ±60 degrees is selected.

According to equation (6), the accuracy of the scale factor depends primarily on the measurement accuracy of the oscillation amplitude and not on the stability of the actuator or the applied drive voltages. The measurement accuracy of acceleration is also dependent on phase measurements, which are highly accurate and not on how the phase is varied. The resolution and bias stability will depend on the smallest measurable phase between the oscillators, which is dependent on the magnitude of the scale factor and the noise.

Unlike the simple pendulum, for which the accuracy and stability of the accelerometer depends on the accuracy and stability of the pick-off and actuator, the accuracy and stability of the GRA is dependent on the accuracy and stability of the pick-offs alone. Gyroscopic rebalance essentially provides a more stable and accurate Scale Factor over simple accelerometers.

Practical Mode of Operation

The ideal GRA will operate with matched Rotor and Servo Member natural frequencies. In the practical case, however, the frequency match is difficult to obtain. Therefore, after the difference (offset) is made small, the GRA is operated by phase-locking the drive frequency to the Rotor or the Servo Member. The second oscillator will then be driven at the same frequency.

Advanced Mode of Operation

The Rotor and Servo Members are mechanical oscillators that are coupled by the overall structure. By actively phase-locking the separate oscillators, the two will lock and oscillate at the same frequency if they are sufficiently close and the feedback amplitude is also sufficient.

GRA Embodiment

Mechanical Design

Figure 3:
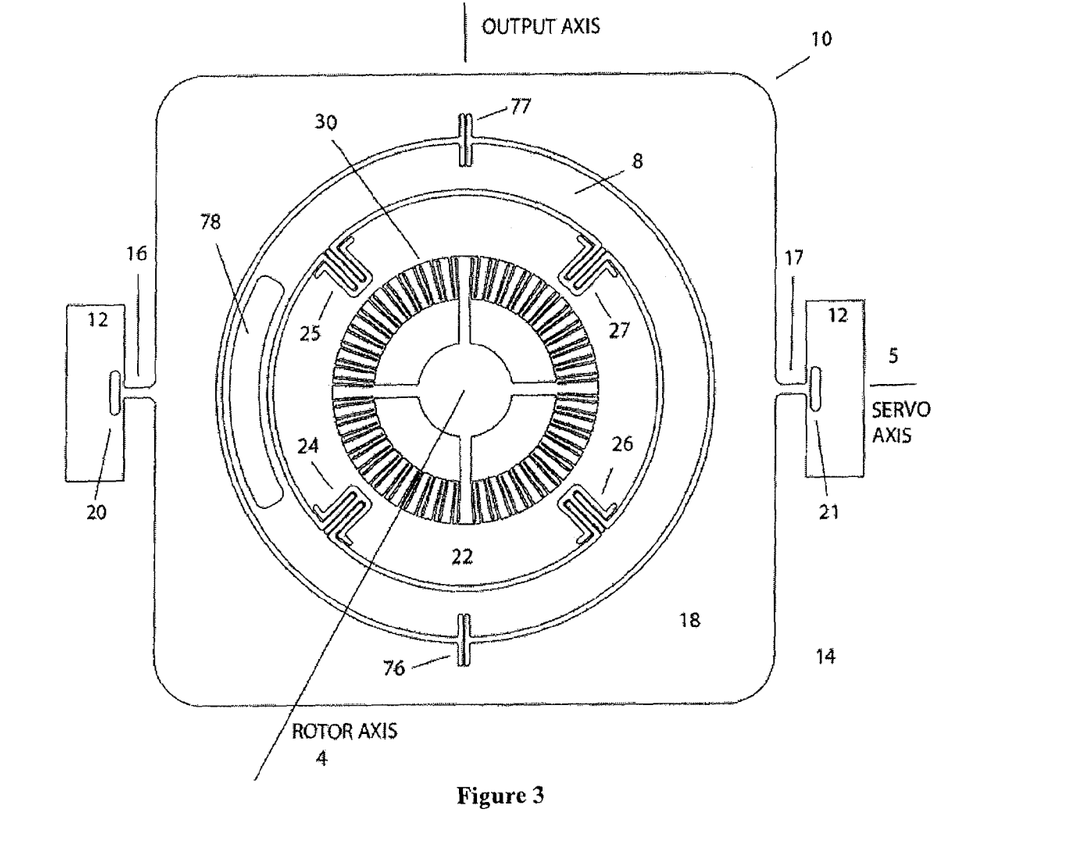
FIG. 3 is a top schematic view of the preferred GRA mechanical design.

The mechanical design of the preferred embodiment of inventive GRA 10 is shown in FIG. 3. The rectangular shapes on each end are bonding pads 12 used to bond the device to the Pyrex substrate 14. Two co-linear torsional flexures 16, 17 connect the Servo Member (SM) 18 to the bonding pads. The flexures are stress-relieved by the oval cutouts 20, 21 in the bonding pads. The square SM shape allows the placement of sufficiently large capacitive plates underneath the SM for actuation. Capacitive sense plates are used to measure the motion of the SM. The Rotor 22 is an annular disk connected to the TSM 8 with four W-shaped flexures 24, 25, 26, 27.

Figure 4:
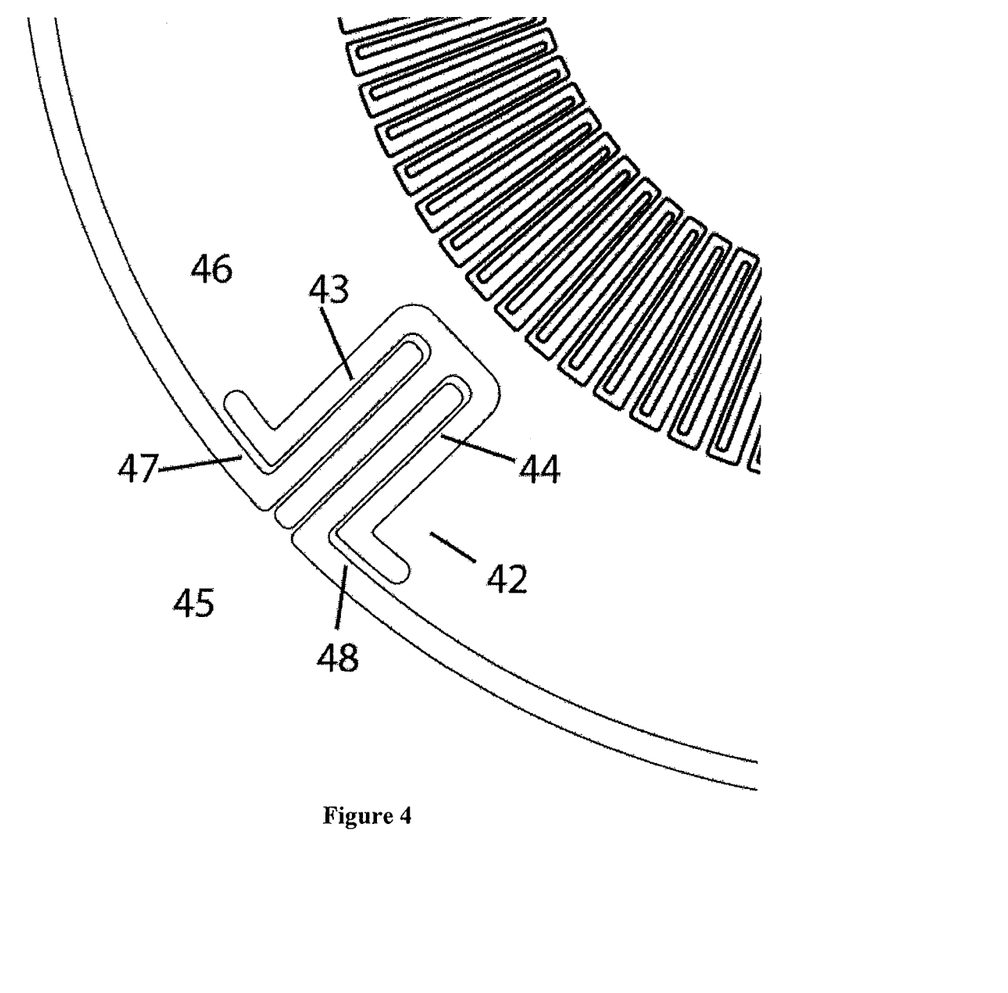
FIG. 4 is a close-up view of the W-flexure design of FIG. 3.

The W-flexure design 42, shown in FIG. 4, is made up of two U-shaped flexures 43, 44. One end of each is connected to the TSM 8 and the other to the Rotor 45 through an L-shaped segment 47, 48 essentially tangent to the rotor disk curvature. The L-shaped segment is added to enable the U-structure to bend with Rotor rotation and to absorb stress between the TSM and Rotor. The radial alignment of the flexures along diagonals across the Rotor disk makes a symmetric arrangement with each flexure experiencing the equivalent stress.

The TSM is connected to the Servo Member with two torsional flexures 76 and 77. The pendulosity is caused by the hole 78 cut into the TSM.

The working gap between the gyro structure and the Pyrex substrate is 10 microns but the gap used depends on several factors: geometry, actuation capacity, sensitivity and fabrication constraints. The gap is fabricated by etching a well in the silicon and a well in the Pyrex, as explained below.

The use of Pyrex is dependent on the need to anodically bond epitaxial silicon to a substrate as described in the DWP process. Other fabrication processes are possible. It is preferred to use a substrate that has similar thermal characteristics to the device material, which in this case is silicon. An option is to also use silicon as the substrate for close thermal match and to enable anodic bonding with a deposited Pyrex-equivalent film added to the substrate silicon. This would also preserve the electrical isolation between devices.

It is preferred for the device to be monolithic for mechanical stability and to connect it to electrical ground.

On the inside diameter of the Rotor is constructed a continuous radial comb 30 around the circumference. The comb fingers are aligned radially with the rotor center of rotation about rotor axis 4. Four sets of stator mating combs are constructed on four separate quadrants, fixed separately to the substrate, two of which actuate the Rotor and two sense its rotation. The stators are connected electrically to pads by crimping the trace between the Pyrex and the silicon during anodic bonding.

The GRA is operated by oscillating the Rotor about the Rotor Axis 4 (about the normal to the plane), oscillating the Servo Member about the Servo Axis 5 and sensing the rotation of the TSM about the GRA Output Axis 6. The GRA Input Axis is the same as the Rotor Axis.

Rotary Comb Capacitive Sensor

Figure 5:
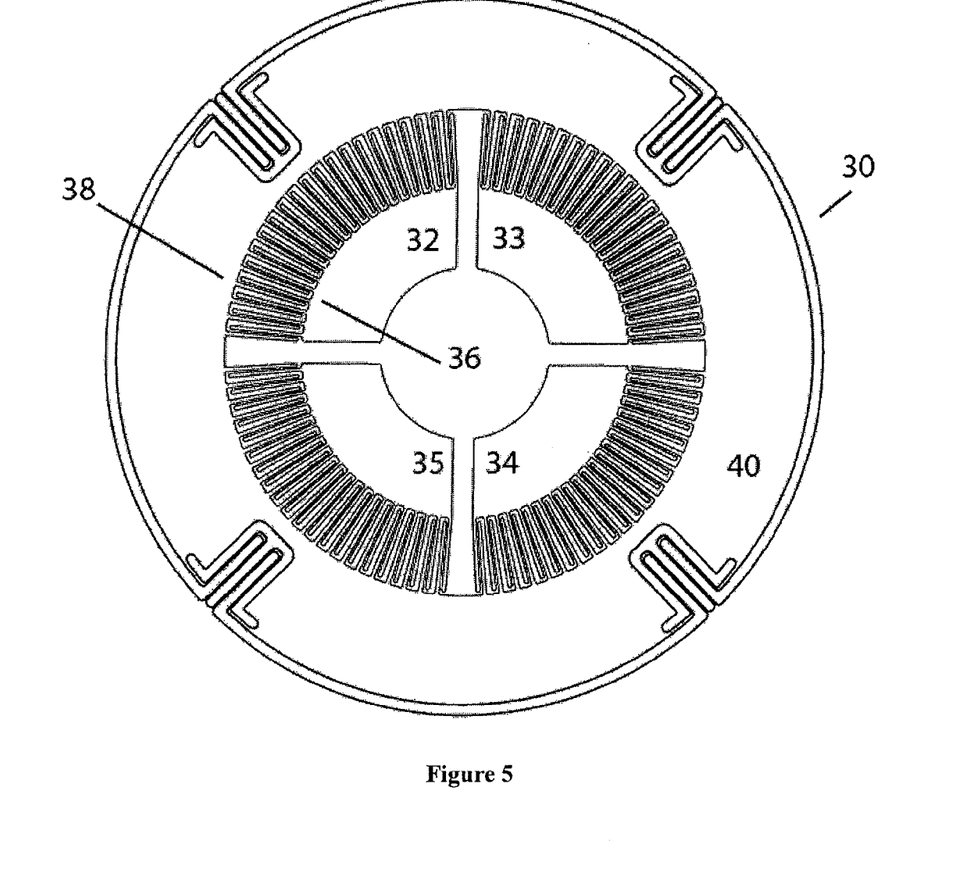
FIG. 5 shows the rotary comb design of FIG. 3.

The rotary comb design 30 is illustrated in FIG. 5. It is separated into four quadrants 32, 33, 34, 35. For each quadrant, the comb is divided into a stator with stator comb fingers 36 attached to the substrate 14 and a rotor with rotor comb fingers 38 that are part of the moving Rotor disk 40. The stator fingers and rotor fingers are aligned radially with the center of rotation of the disk. For each rotor finger there is a stator finger with the two separated by a small gap. They make up a comb finger pair. Pairs of comb fingers are separated by a large gap. A number of comb finger pairs makes up each quadrant. The sensitivity of the comb sensor scales with the number of comb finger pairs. By reducing the small gap between the comb finger pairs, the sensitivity is increased.

Figure 6:
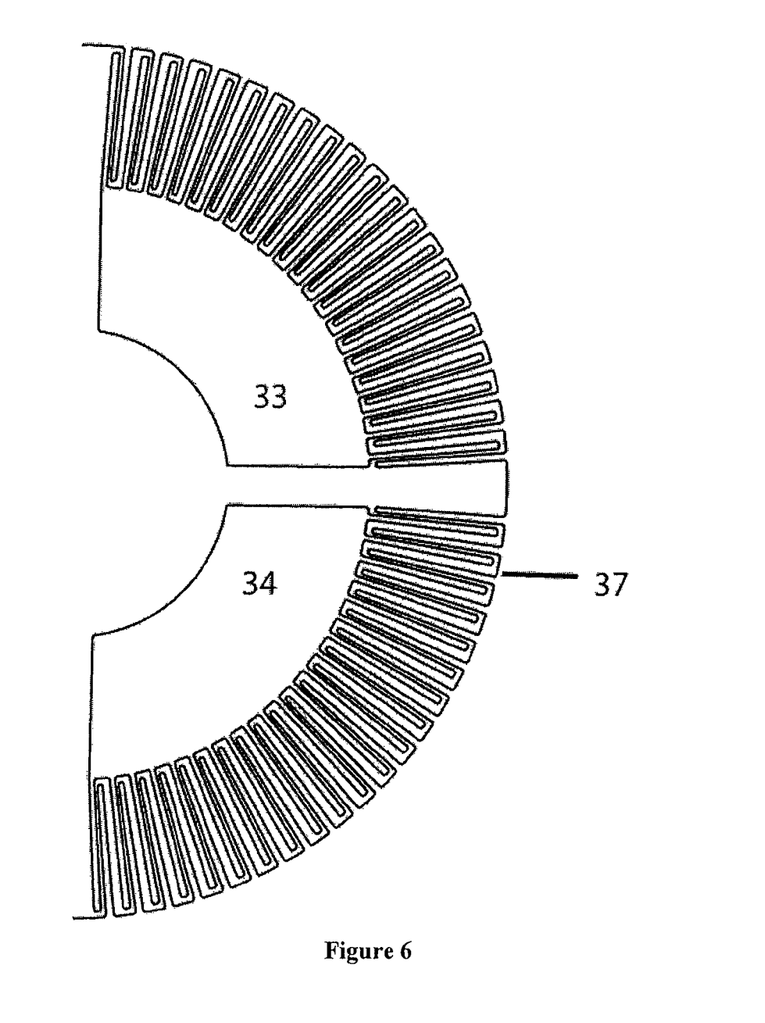
FIG. 6 shows neighboring comb segments of the rotary comb design of FIG. 5.

Neighboring quadrants 33, 34 are designed symmetrically about the axis that separates them as shown in FIG. 6. For rotation of the rotor in either direction, the small gap 37 of comb finger pairs in one quadrant decreases while the small gap of comb finger pairs in the other quadrant increases. The purpose of the rotary design based on neighboring quadrants is that when the signals from the comb finger pairs located on two neighboring quadrants are differenced, the signals add and the common-mode noise subtracts; this is differential operation. At zero rotation of the IM, the output is also zero. The other two quadrants 32, 35 are used to actuate the rotor.

Metallization Design

Figure 7:
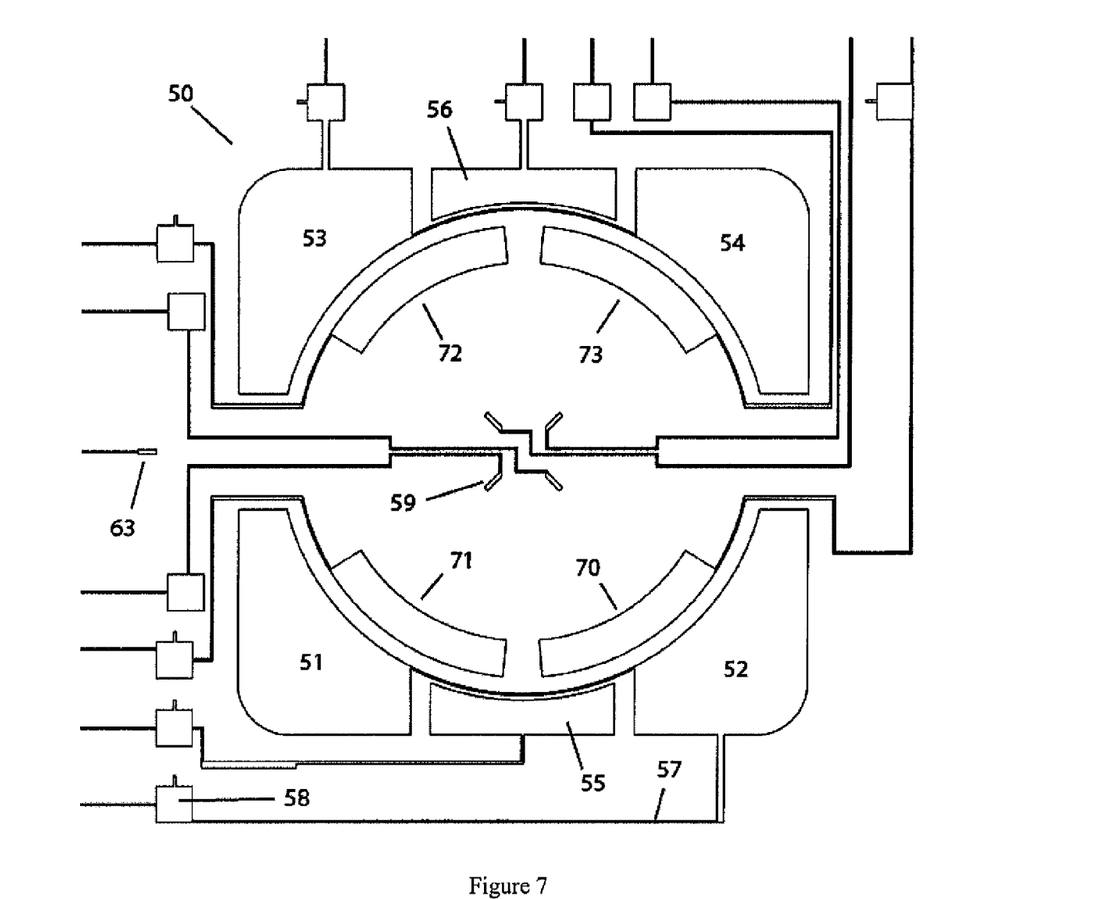
FIG. 7 shows the GRA metallization layout for the preferred embodiment.

The metallization design 50 is shown in FIG. 7. It consists of capacitive plates, connecting traces and pads. Capacitive plates 51 and 52 are located under part of the SM on one side of the Servo Axis. They are connected by a trace. Capacitive plates 53, 54 are located on the other side. They are connected by a trace. Drive voltages are applied to the actuator plates to predominantly pull down on one side of the SM during the first half of the drive cycle and to predominantly pull down on the other side of the SM during the second half of the drive cycle. The result is an oscillatory motion of the SM about the Servo Axis. The sensing of the SM motion is accomplished with two capacitive plates 55, 56. The outputs are connected differentially since for any motion, the gap for one increases and the gap for the other decreases.

Capacitive plates 70, 71, 72 and 73 are used to sense the rotation of the TSM.

Trace 57 connects capacitive plates 51, 52 to the pad 58, for example.

Stators of the rotary comb are connected to pads with traces 59 that are crimped between the stator structure and the Pyrex substrate during anodic bonding. The GRA monolithic structure containing the SM, Rotor and TSM is connected to electrical ground with trace 63 crimped between the mounting structures 12 and the Pyrex substrate.

Traces also act as capacitive sensing plates when they are located beneath the moving structure, and this needs to be taken into consideration. A rule is to make the lengths under the moving parts equal and symmetric. Pick-up between plates is also a consideration. Design practices known in the art apply. Electrical pick-up can be a source of quadrature in the gyro output.

Electrical Leads

Electrical leads or traces connect the capacitive sensors and actuators to the termination pads on the periphery of the instrument. The gyro is grounded by a trace that is crimped under the supporting mesa during anodic bonding. Stator combs are connected similarly by crimping traces under their mesas. Plates are connected directly to the pads.

Several considerations apply:
traces that pass under silicon structures add stray capacitance, therefore this transit should be minimized,
traces that are required to pass under silicon structures should be symmetric so that the influence of any leakage capacitance will cancel under differential operation of the pick-off (capacitive sensors) and actuators, and
traces should be routed to minimize capacitive coupling between them.

Flexures

The purposes of flexures are to:
set orientational alignment between members,
govern rotation of the members about prescribed axes, and
provide support for the structures.

The orientational alignment between members is an especially important consideration for the gyroscope because it will introduce mechanical coupling between the OM oscillation and the Output Member to generate quadrature error.

The ideal flexure allows only motion about one axis.

The support capability is especially important when considering shock capability. Through a combination of the necessary design weight and flexure design, there is a maximum possible shock capability. Modeling can be used to find structurally-weak points and strengthen them.

SM Flexure Relief Structure

The stress relief absorbs the tension on the flexure that is due to the differential thermal expansion between the Pyrex and epitaxially-doped silicon, while cooling from the elevated anodic bonding temperature. If a different process is used, the stress relief may not be necessary. Without the stress relief, the tension on the flexure will cause a potato chip deformation of the SM structure that introduces stress between the SM and the TSM and rotor, inhibiting their proper operation.

Rotor Flexure

The W-flexure enables rotation of the IM about the normal to the plane. Four are used in this design. Each W-flexure is composed of two bending U-flexures with a stress relief in each. For cases where the OM applies a tension or compression to the W-flexure, the stress relief can bend and absorb the stress. In this way, the flexure does not kink and inhibit rotation of the IM.

Design Modification

Figure 8:
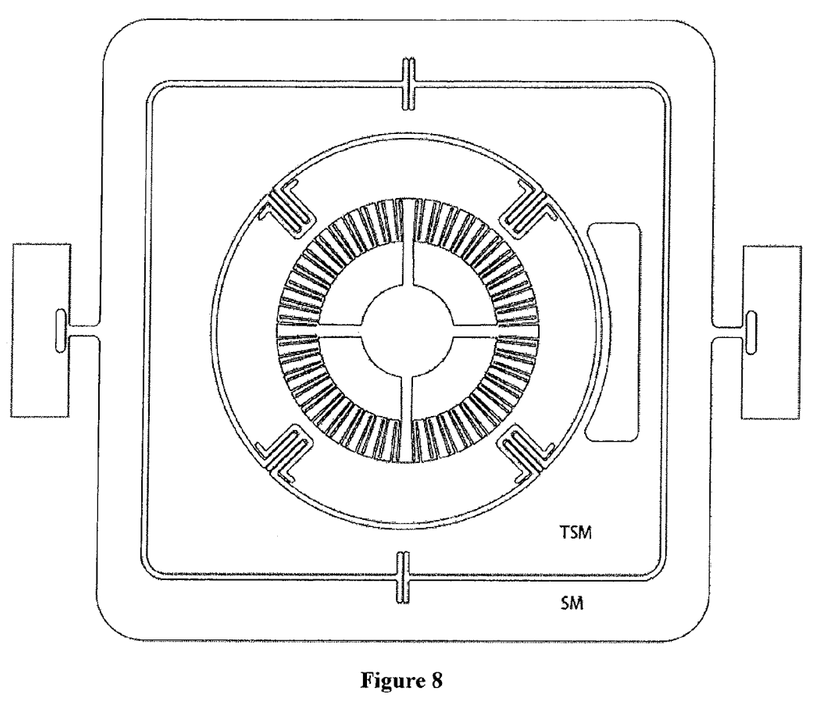
FIG. 8 is a view similar to that of FIG. 3 for an alternative embodiment of a GRA with square TSM geometry.

A second design of the first iteration is shown in FIG. 8. It modifies shape of the TSM from circular to square. One reason is to reduce the mechanical coupling with the Rotor. The greater inertia and the larger area would also provide greater capacitive pick-off sensitivity and a larger proofmass. The downside is that the Servo Member surface area is smaller and the capacitive drive and sense efficiency is reduced.

Description of Preferred Electronics

Figure 9:
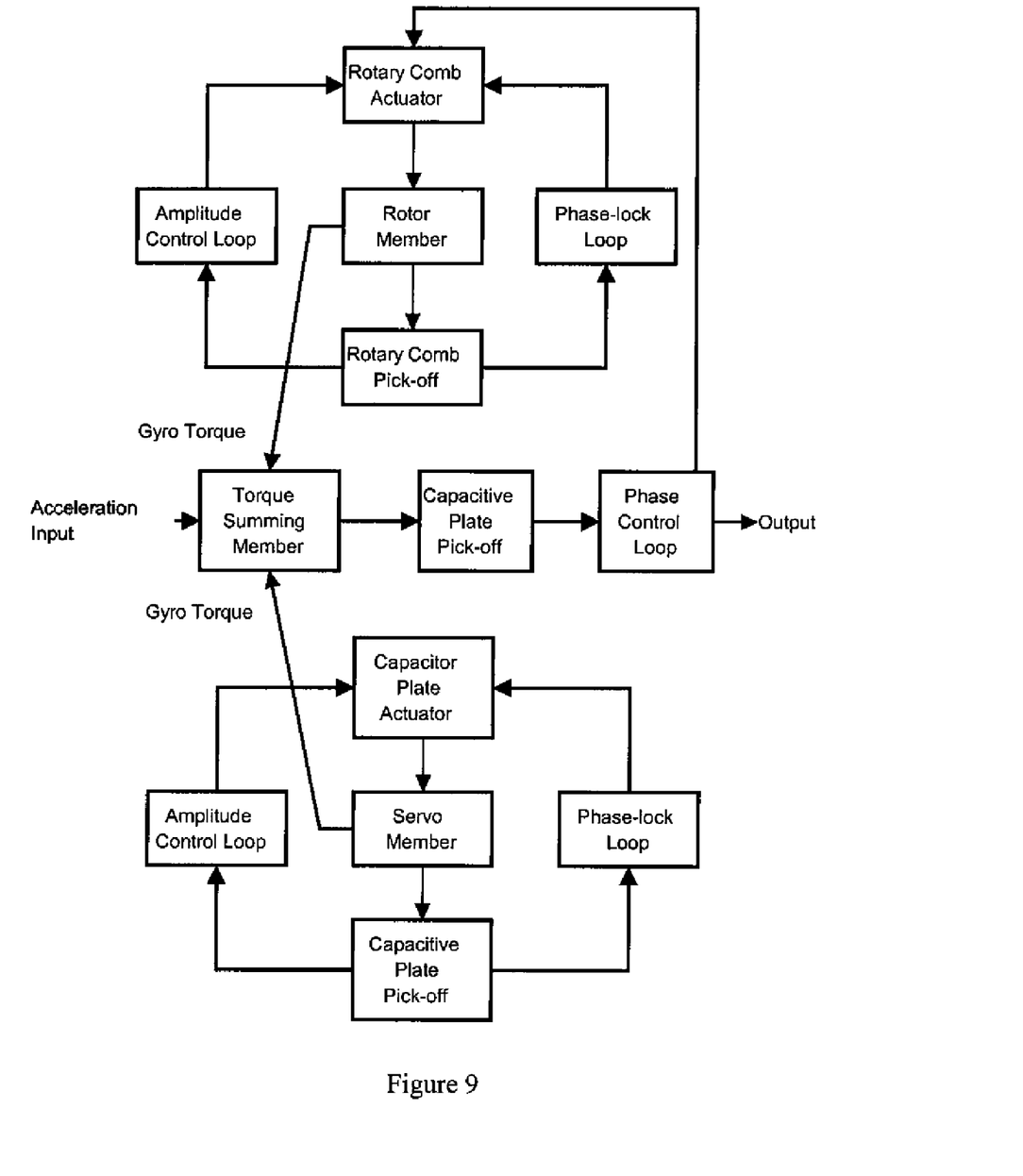
FIG. 9 is a functional block diagram of the preferred GRA electronics.

The preferred GRA electronics are described with a block schematic in FIG. 9. A rotary capacitive comb actuator is used to drive the rotor member into oscillation at its resonant frequency for low power consumption. A rotary capacitive comb pick-off (sensor) is used to sense the oscillation amplitude and phase. An amplitude control loop is used to hold the amplitude constant. The phase of the motion is used with a phase-lock loop to hold the rotor member on resonance. Similar electronics are used for the servo member. The servo member is designed to oscillate at the same frequency as the rotor member for one embodiment. Capacitive plate actuators and pick-offs (sensors) are used for this member because its motion is towards and away from the plane.

Under acceleration input, the pendulum is caused to rotate. The pendulum signal is used with a phase control loop to vary the phase of either the Rotor or Servo Member to apply gyroscope torque to counter the motion of the pendulum and bring it back to null. Only rotor phase control is shown in FIG. 9. The cosine of the phase change is proportional to the acceleration input.

The maximum operating range of the GRA is set to the most linear segment of the cos δ control variable. The optimum resolution depends on the smallest equivalent phase that can be resolved, which depends on the sensor sensitivity and the electronics noise as determined by the Allan Deviation and Scale Factor.

Optional Open-Loop Mode of Operation

The GRA can also be operated open loop. In this case the Rotor and Servo Members are driven in the same way: at the same frequency and with constant amplitudes. The difference is that, as the pendulum is acted upon by acceleration input, the pendulum is allowed to rotate. The response is a phase change between the oscillators. The phase change is the output.

Dissolved Wafer Processing

Dissolved Wafer Processing (DWP) is a MEMS fabrication process for making relatively large parts with good flatness and square profiles. The process requires two wafers: the first Pyrex and the second silicon with a boron-doped epitaxial layer. The combination of materials enables the two wafers to be anodically bonded. The thickness of the epitaxy determines the final device thickness, while boron doping of the epitaxial layer inhibits EDP etching.

Typical dimensions include: device size of about 3 mm in the plane, device thickness of 40 microns, smallest flexure thickness of 5 microns and gaps between comb fingers of 5 microns.

Four process masks are needed: two for processing the silicon and two for the Pyrex. Instrument functions are distributed between the two layers: the mechanical structure and comb components are fabricated in the doped silicon layer and the electrical connections and flat capacitive plate components are deposited onto the Pyrex layer. A detailed description of the process follows.

Process Steps

Figure 10:
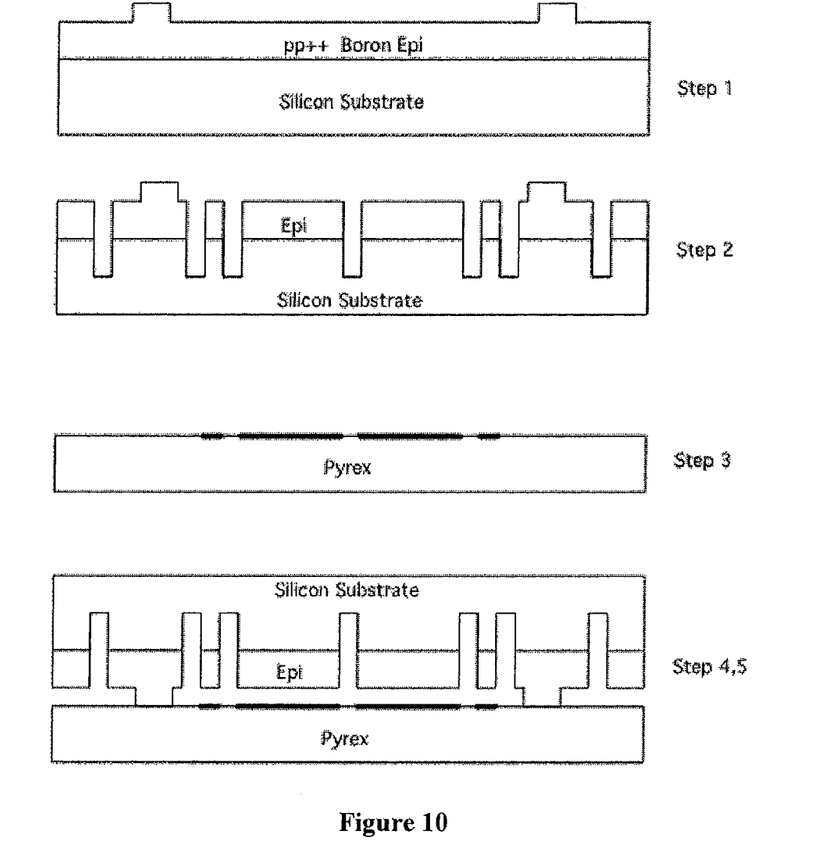
FIG. 10 schematically depicts the preferred Dissolved Wafer Process steps.
Figure 11:
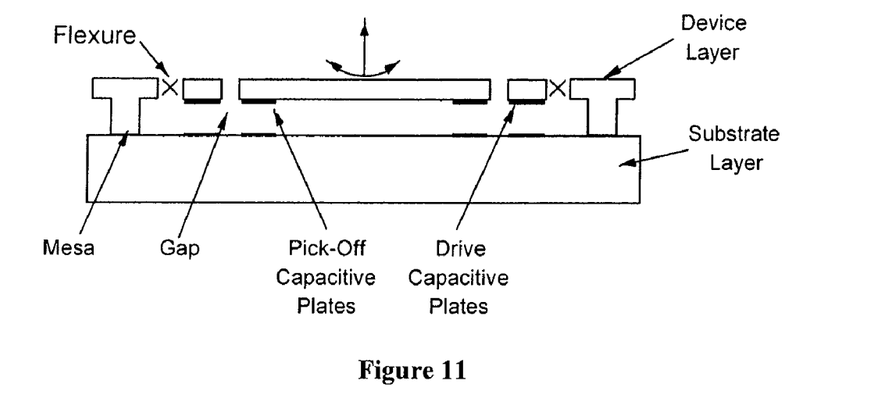
FIG. 11 is a schematic side-view of a completed GRA device after the silicon substrate is etched away.

The process steps are described with reference to FIG. 10. The starting silicon wafer includes a grown epitaxial layer with heavy boron diffusion of 43-micron thickness. In step 1, the epitaxial layer is etched to form mesas that support the silicon structures on the Pyrex as patterned by Mask 1. The mesa thickness also sets part of the gap between the device and the substrate that allows motion of parts. In step 2, deep reactive ion etching is used to etch through the epitaxial layer to form the device geometry that includes the structure, mass and combs as patterned with Mask 2. In step 3, wells are formed in the Pyrex to form the rest of the required gap using Mask 3. With Mask 4 (step 4), metal deposited on the Pyrex is patterned to form capacitive plates for driving and sensing out of plane motions. In addition, Mask 4 patterns traces (conductors) that connect the structure, capacitive plates and the comb stators to the pads. In step 5, the silicon wafer is anodically bonded to the Pyrex wafer by the mesas. In step 6 the wafer is cut with a saw along outlines (streets) that separate devices. Each device is then EDP (Ethylene-Diamene-Pyrocatechol) etched to remove the silicon, leaving behind epitaxial devices with movable parts. The thickness of the devices is equal to the epitaxial thickness minus the mesa thickness, approximately 40 microns for the present devices. A conceptual side view of the finished device is shown in FIG. 11.

Advantages/Disadvantages of DWP

DWP has several advantages:
devices are made of one material (doped silicon) for greater thermal stability,
Pyrex serves as a robust substrate since it can be made as thick as desired,
multiple devices can be fabricated on the same Pyrex substrate, while making them physically separate,
thicker doped silicon devices can be made subject to the epitaxial process,
the process is a relatively low-temperature process, thereby generating low internal stresses.

The disadvantages of DWP are not limiting, but can contribute to cost of fabrication and greater design complication. They include:
epitaxial growth limits the device thickness and introduces stresses,
chemical etching of most of the silicon wafer by EDP,
induced stresses from differential expansion of the silicon and Pyrex from the anodic bonding operation, and
reactive ion etching produces some tapering which makes it difficult to assign a resonance frequency.

It is important to form flexures with precise geometry and having a rectangular cross-section. A small variation in the wall verticality can greatly affect the stiffness and hence the dynamics. A conical cross-section would also have the effect of changing the rotation axis of the IM, and perhaps the orthogonality between the OM and IM axes. This misalignment leads to "quadrature error" in gyroscopes.

Since certain changes that would be apparent to one skilled in the art may be made in the above described embodiments of the invention without departing from the scope thereof, it is intended that all matter contained herein be interpreted in an illustrative and not a limiting sense.

Other embodiments will occur to those skilled in the art and are within the following claims.

What is claimed is:

1. An accelerometer that lies generally in a plane, for detecting acceleration along an input axis that is orthogonal to the plane of the accelerometer, comprising:
   a substrate defining a surface;
   spaced bonding pads coupled to the substrate and projecting from the surface of the substrate;
   a generally planar Servo Member (SM) spaced from and essentially parallel to the surface of the substrate and flexibly coupled to the bonding pads by servo member flexures such that the servo member is capable of oscillatory motion relative to the substrate about a servo axis that is in the plane of the servo member;
   a generally planar plate Torque Summing Member (TSM) located within, coplanar with, and flexibly coupled to the SM such that the TSM is capable of rotational motion relative to the substrate about an output axis that is in the plane of the TSM and orthogonal to the servo axis, the TSM being mass-imbalanced relative to the output axis;
   a generally planar plate rotor located within, coplanar with, and flexibly coupled to the TSM such that the rotor is capable of rotary oscillatory motion relative to the TSM about a rotor axis that is orthogonal to the plane of the rotor, the torque summing member and the servo member;
   one or more rotor drives for directly oscillating the rotor about the rotor axis at a rotor oscillation frequency and amplitude;
   one or more SM drives for oscillating the SM about the servo axis at a servo member oscillation frequency and amplitude, and thereby also oscillating the rotor and torque summing member about the servo axis at the servo member oscillation frequency;

one or more rotor motion sensors that detect oscillation of the rotor relative to the substrate about the rotor axis;

one or more SM motion sensors that detect oscillation of the SM relative to the substrate about the servo axis; and one or more TSM motion sensors that detect rotation of the TSM relative to the substrate about the output axis.

2. The accelerometer of claim 1 in which the servo member drives comprise capacitive drives.

3. The accelerometer of claim 2 in which the servo member drives and the servo member motion sensors each comprise plates on the surface of the substrate, spaced from the servo member, and in which the servo member drive plates and servo member motion sensor plates are electrically isolated from one another.

4. The accelerometer of claim 3 in which at least the surface of the substrate on which the drive and sensor plates are located is electrically insulating.

5. The accelerometer of claim 4 in which at least the surface of the substrate on which the drive and sensor plates are located is Pyrex glass.

6. The accelerometer of claim 1 in which there is at least one servo member drive on each side of the servo axis.

7. The accelerometer of claim 1 in which the rotor drives and rotor motion sensors comprise capacitive devices.

8. The accelerometer of claim 7 in which the rotor drives and rotor motion sensors comprise portions of a rotary comb capacitive device comprising sets of mating combs defined by one or more stators coupled to the substrate and one or more rotors coupled to the rotor.

9. The accelerometer of claim 8 in which the rotary comb capacitive device comprises four stator sectors coupled to the substrate that are symmetrically, radially arranged around the rotor axis to form the stators of four device sectors.

10. The accelerometer of claim 9 in which two of the four device sectors are used for sensing, and the signals from these two sectors are differenced, to increase the signal strength and reduce common-mode noise.

11. The accelerometer of claim 1 further comprising a control loop, responsive to the servo member motion sensors, for maintaining the oscillation amplitude of the servo member constant.

12. The accelerometer of claim 1 in which the rotor oscillates at its resonant frequency and the servo member oscillates at the same frequency.

13. The accelerometer of claim 1 in which the rotor is flexibly coupled to the torque summing member by a plurality of rotor flexures.

14. The accelerometer of claim 13 in which the rotor defines a circular perimeter, and the rotor flexures are spaced evenly about the rotor perimeter.

15. The accelerometer of claim 14 in which the rotor flexures each comprise two bending "U" flexures.

16. The accelerometer of claim 15 in which the rotor flexures each further comprise a stress relief feature comprising a bend in the flexure.

17. The accelerometer of claim 13 in which the rotor is coupled to the torque summing member by flexures that are radial relative to the rotor axis.

18. The accelerometer of claim 1 in which the rotor and the torque summing member are each generally annular, and are concentric.

19. The accelerometer of claim 1 in which the torque summing member is flexibly coupled to the servo member by a pair of collinear torsional flexures that each comprise a stress relief feature.

20. The accelerometer of claim 1 in which the rotor and the servo member are each symmetric about the servo axis and the output axis.

21. The accelerometer of claim 1 in which at least the servo member, the torque summing member, the rotor and the bonding pads are made from a silicon monolith.

22. The accelerometer of claim 21 in which at least the servo member, the torque summing member, the rotor and the bonding pads are made by a dissolved wafer process.

23. The accelerometer of claim 1 in which at least the torque summing member and the rotor are maintained at a common electrical potential.

24. The accelerometer of claim 23 in which the common electrical potential is ground.

25. The accelerometer of claim 1 in which the servo member flexures comprise in-line torsional flexures.

26. The accelerometer of claim 25 in which the servo member flexures each further comprise a stress relief feature.

27. The accelerometer of claim 1 in which the rotor, the torque summing member and the servo member are concentric.

28. The accelerometer of claim 1 in which the rotor and the servo member are each symmetric about both the servo axis and the input axis.

29. The accelerometer of claim 3 in which the servo member drive plates and sensor plates are symmetric with respect to the servo axis.

30. The accelerometer of claim 1 in which the servo member oscillation about the servo axis is at a constant frequency and amplitude.

31. The accelerometer of claim 30 in which the rotor oscillation about the rotor axis is at a constant frequency and amplitude.

32. The accelerometer of claim 31 in which the rotor and the servo member oscillate at the same frequency, and further comprising a control loop, responsive to the torque summing member motion sensor, for varying the phase of either the rotor or the servo member to apply gyroscopic torque to counter motion of the torque summing member and bring it back to null.

33. The accelerometer of claim 32 in which the phase change is related to the acceleration input.

34. The accelerometer of claim 32 in which the torque summing member rotation due to acceleration input causes a phase change between the rotor and the servo member that is related to the acceleration input.

35. The accelerometer of claim 1 further comprising a control loop, responsive to the rotor motion sensors, for maintaining the oscillation amplitude of the rotor constant.

36. The accelerometer of claim 1 in which the torque summing member motion sensors comprise capacitive plates on the surface of the substrate, spaced from the torque summing member.

37. The accelerometer of claim 1 further comprising at least one phase-lock loop control that locks onto the resonance of at least one of the rotor and servo member.

38. The accelerometer of claim 1 comprising two controllers for each of the rotor and servo member, one a phase-lock loop and the second an amplitude control loop.

* * * * *